US009089987B2

(12) United States Patent
Walker et al.

(10) Patent No.: US 9,089,987 B2
(45) Date of Patent: Jul. 28, 2015

(54) ROTARY KNIFE FIXTURE FOR CUTTING SPIRAL, TEXTURED POTATO PIECES

(71) Applicant: J.R. Simplot Company, Boise, ID (US)

(72) Inventors: David Bruce Walker, Meridian, ID (US); Allen J. Neel, Nampa, ID (US)

(73) Assignee: J.R. Simplot Company, Boise, ID (US)

( * ) Notice: Subject to any disclaimer, the term of this patent is extended or adjusted under 35 U.S.C. 154(b) by 103 days.

(21) Appl. No.: 13/647,319

(22) Filed: Oct. 8, 2012

(65) Prior Publication Data

US 2013/0087032 A1 Apr. 11, 2013

Related U.S. Application Data

(60) Provisional application No. 61/661,278, filed on Jun. 18, 2012, provisional application No. 61/546,035, filed on Oct. 11, 2011.

(51) Int. Cl.

| | |
|---|---|
| ***B23D 25/02*** | (2006.01) |
| ***B26D 1/02*** | (2006.01) |
| ***B26D 1/28*** | (2006.01) |
| ***B26D 3/11*** | (2006.01) |
| ***B26D 5/20*** | (2006.01) |
| ***B26D 7/06*** | (2006.01) |
| *B26D 1/00* | (2006.01) |

(52) U.S. Cl.

CPC .. *B26D 1/28* (2013.01); *B26D 3/11* (2013.01); *B26D 5/20* (2013.01); *B26D 7/0658* (2013.01); *B26D 2001/0073* (2013.01); *Y10T 83/6472* (2015.04); *Y10T 83/8789* (2015.04); *Y10T 83/9372* (2015.04)

(58) Field of Classification Search

CPC .... B26D 1/28; B26D 2001/0073; B26D 3/11; B26D 5/20; B26D 7/0658; B26D 1/0006; B26D 2001/0033; B26D 7/01

USPC ........... 83/857, 932, 402, 601, 591–596, 340, 83/342, 672, 856, 858; 416/223 R, 228, 416/236 R, 189, 235, 238, DIG. 2; 415/121.1; 241/282.2, 292.1; 30/347, 30/355–357

See application file for complete search history.

(56) References Cited

U.S. PATENT DOCUMENTS

| | | | | | |
|---|---|---|---|---|---|
| 371,579 | A | * | 10/1887 | Harding | 83/129 |
| 1,494,102 | A | * | 5/1924 | Cramer | 366/318 |
| 4,393,737 | A | * | 7/1983 | Shibata | 83/356.3 |
| 4,911,045 | A | * | 3/1990 | Mendenhall | 83/98 |

(Continued)

*Primary Examiner* — Ghassem Alie
*Assistant Examiner* — Bharat C Patel
(74) *Attorney, Agent, or Firm* — Lowry Blixseth LLP; Scott M. Lowry

(57) ABSTRACT

A rotary knife fixture for cutting vegetable products such as raw potatoes into spiral shapes. The knife fixture includes a ring-shaped blade holder driven rotatably within a hydraulic product flow path. The blade holder includes at least one cutting blade, wherein the blade is twisted from a generally longitudinally aligned center axis outwardly in opposite circumferential directions with a sharpened leading edge set at a desired pitch angle. By controlling the pitch angle of the blade in relation to the blade rotational speed and velocity at which the potato travels along the hydraulic flow path, the resultant spiral cut shape is selected. By using multiple cutting blades at known axially spaced positions and selecting the angular position of each cutting blade in succession, the number of spiral shapes cut from each potato is selected. The blades can have a nontextured straight-cut edge, or a textured crinkle-cut edge, or a combination.

20 Claims, 5 Drawing Sheets

(56) References Cited

U.S. PATENT DOCUMENTS

| | | | | | |
|---|---|---|---|---|---|
| 5,097,735 | A | | 3/1992 | Mendenhall | |
| 5,167,177 | A | | 12/1992 | Cimperman et al. | |
| 5,167,178 | A | * | 12/1992 | Cimperman et al. | 83/865 |
| 5,168,784 | A | * | 12/1992 | Foster et al. | 83/24 |
| 5,174,181 | A | | 12/1992 | Julian et al. | |
| 5,179,881 | A | * | 1/1993 | Frey et al. | 83/98 |
| 5,224,409 | A | * | 7/1993 | Cimperman et al. | 83/862 |
| 5,277,546 | A | * | 1/1994 | Frey et al. | 415/202 |
| 5,293,803 | A | * | 3/1994 | Foster | 83/865 |
| 5,343,791 | A | * | 9/1994 | Julian et al. | 83/865 |
| 5,394,780 | A | * | 3/1995 | Foster et al. | 83/402 |
| 5,394,793 | A | * | 3/1995 | Julian et al. | 99/538 |
| 5,421,226 | A | * | 6/1995 | Mendenhall | 83/22 |
| 5,473,967 | A | * | 12/1995 | Frey et al. | 83/402 |
| 5,655,428 | A | * | 8/1997 | Cockburn et al. | 83/857 |
| 5,806,397 | A | * | 9/1998 | Mendenhall | 83/402 |
| 5,904,083 | A | * | 5/1999 | Jensen et al. | 83/62 |
| 5,992,287 | A | * | 11/1999 | Dube | 83/865 |
| RE38,149 | E | * | 6/2003 | Dube et al. | 83/865 |
| 6,799,495 | B2 | * | 10/2004 | Jensen | 83/62.1 |
| 6,923,104 | B2 | * | 8/2005 | Jensen | 83/581.1 |
| 6,955,110 | B1 | * | 10/2005 | Spletzer et al. | 83/672 |
| 7,513,450 | B2 | * | 4/2009 | Young et al. | 241/292.1 |
| 7,721,637 | B2 | * | 5/2010 | Bucks | 83/663 |
| 2001/0042428 | A1 | | 11/2001 | Jensen | |
| 2003/0072835 | A1 | | 4/2003 | Weinstein et al. | |

* cited by examiner

ROTARY KNIFE FIXTURE FOR CUTTING SPIRAL, TEXTURED POTATO PIECES

BACKGROUND OF THE INVENTION

This invention relates generally to devices and methods for cutting food products, such as vegetable products, and particularly such as raw potatoes and the like, into spiral or helical shaped pieces, whose cut surfaces may be patterned by the design of knife blades, such as to create textured "crinkle-cut" spiral or helical pieces.

Production cutting systems and related knife fixtures are useful for cutting vegetable products such as raw potatoes into spiral or helical shaped pieces, preparatory to further production processing steps such as blanching and parfrying. In this regard, one typical production system comprises a hydraulic cutting system wherein a so-called water knife fixture is mounted along the length of an elongated tubular conduit. A pumping device is provided to entrain the vegetable product such as raw potatoes within a propelling water flume for cutting engagement with knife blades of the water knife fixture. The vegetable product is pumped one at a time in single file succession into and through the water conduit with a velocity and sufficient kinetic energy to carry the vegetable product through a relatively complex knife fixture which includes at least one rotary cutting blade for severing the product into a plurality of smaller pieces of generally spiral or helical shape. The cut pieces are then carried further through a discharge conduit for appropriate subsequent processing, including cooking or blanching, parfrying, freezing and packaging steps, for subsequent finish processing and serving to customers as loops, twirls, curly fries, etc.

Examples of such hydraulic cutting systems and related rotary knife fixtures are found in U.S. Pat. Nos. 5,168,784; 5,179,881; 5,277,546; 5,343,791; 5,394,780; 5,394,793; 5,473,967; 5,992,287; and Re. 38,149, all of which are incorporated by reference herein. Persons skilled in the art will recognize and appreciate that mechanical production feed systems may be employed in lieu of hydraulic feed systems, as described in U.S. Pat Nos. 5,097,735; 5,167,177; 5,167,178; and 5,293,803, which are also incorporated by reference herein.

The present invention is directed to an improved rotary knife fixture and related cutting blades for cutting raw vegetable products, such as potatoes, into spiral shaped pieces that may or may not have textured cut surfaces, such as crinkles, waves, or other designs.

SUMMARY OF THE INVENTION

In accordance with the invention, a rotary knife fixture is provided for cutting vegetable products such as raw potatoes into spiral shapes. The knife fixture comprises a circular or ring-shaped blade holder adapted to be rotatably driven at a selected rotational speed within a hydraulic product flow path. The blade holder carries at least one cutting blade rotated therewith, wherein the blade is twisted from a generally longitudinally aligned center axis outwardly in opposite radial directions with a sharpened leading edge set at a desired pitch angle. By controlling the pitch of the blade in relation to the rotational speed of the blade and the velocity at which the potato travels along the hydraulic flow path, the resultant spiral cut shape is selected. By using multiple cutting blades at known axially spaced positions and selecting the angular position of each cutting blade in succession, the number of spiral shapes cut from each potato is also selected.

In one preferred form, the ring-shaped blade holder of the rotary knife fixture is rotatably driven within a vegetable product flow path, such as along a hydraulic flow conduit having raw vegetables such as potatoes carried in single file there through. The blade holder supports at least one cutting blade which is twisted from a generally longitudinally aligned center axis outwardly in opposite radial directions, and defining a pair of sharpened cutting edges presented in opposite circumferential directions. Each half of the cutting blade is set at a selected pitch angle which varies according to specific radial position, per the formula:

$$\text{Pitch Angle}=\text{Arc Tan}(2\times\text{Pi}\times\text{Radius}/\text{Pitch Length}). \quad (1)$$

For a blade diameter equal to 4 inches (radius=2 inches), and a pitch length equal to 3 inches, each cutting blade is anchored at its outer edge on the associated ring-shaped blade holder at an angle of about 76.6°. However, note that the specific pitch angle will vary according to radial position along the blade and the pitch length.

In use, the single cutting blade is rotatably driven, in a preferred form, at a rotational speed of about 6,000 revolutions per minute (rpm), to cut each potato traveling along the hydraulic flow conduit at a velocity of about 25 feet per second (fps) into a pair of generally spiral shaped pieces. With a pitch length of about 3 inches potato travel per cutting blade revolution, this results in substantially optimum cutting of each potato. In one embodiment, a cutting blade is rotatably driven at a rotational speed anywhere from about 4,000 rpm to 8,000 rpm. In one embodiment, a cutting blade is rotatably driven at a rotational speed anywhere from about 4,000 rpm, about 5,000 rpm, about 6,000 rpm, about 7,000 rpm, or about 8,000 rpm, or at revolutions greater than 8,000 rpm.

When more than one cutting blade is used, each of the cutting blades may be physically supported in a stack of ring-shaped blade holders having a known axial dimension such as about 0.5 inch per blade holder, with the multiple blade holders being fixed for rotation together. With this configuration, the angle Θ (theta) separating each of the supported cutting blades in succession is given by the formula:

$$\Theta=T/P\ (\text{axial dimension of each blade holder/pitch length})\times 360°+360°/N\ (\text{number of cut pieces}). \quad (2)$$

Following this formula, when two cutting blades (N) are used, each carried by a 0.5 inch thick ring-shaped blade holder (T), with a pitch length (P) of 3 inches, a total of four spiral pieces are cut from each product, and the second cutting blade is rotationally set to lag the first cutting blade by 150°. Similarly, where three cutting blades are used, each product is cut into a total of six spiral pieces, and the second blade is oriented to lag the first blade by 120°, and the third blade is oriented to lag the second by an additional 120°, or a total lag from the first blade of about 240°. And, where four cutting blades are used, each product is cut into a total of eight spiral pieces, and the four blades are oriented respectively to lag the immediately preceding blade by about 105°.

Accordingly, the present invention encompasses a configuration of multiple blades to produce 2, 4, 6, 8, or more spiral pieces per product. In addition to even numbers of spiral pieces cut per product, the present invention encompasses a configuration of blades that produce 3, 5, 7, 9 or more spiral pieces per product. An example of such a spiral piece is shown in D640,036, which is incorporated herein by reference.

A further aspect of the present invention is a cutting blade designed to have a textured or "crinkled" surface edge so that when it cuts the product, the exposed cut surface is similarly textured or crinkled. Accordingly, in one embodiment crinkle-cut spiral pieces of product can be produced using the inventive blades and cutting system.

In any embodiment, or permutation, of cutting blades and number of cutting blades in the inventive cutting system, any number of spiral pieces can be obtained per product. That is 2, 3, 4, 5, 6, 7, 8, 9, or 10, or more than 10 spiral pieces may be cut from each product. In another embodiment any number or all of the cutting blades may be textured or crinkled to produce textured or crinkled cut surfaces on a spiral piece. Thus, in one embodiment every spiral piece cut from one product may contain at least one crinkle-textured cut surface if every cutting blade in the cutting system has a crinkled surface edge. However in another embodiment not every cutting blade in the cutting system has a wavy, textured, or crinkled edge. Thus, in that instance, a single product may be cut to yield smooth surface spiral pieces as well as crinkle-cut spiral pieces.

By "product" is meant any vegetable or fruit or wood. A vegetable that may be cut into 2, 3, 4, 5, 6, 7, 8, 9, 10, or more than 10 spiral pieces that may have smooth or textured/crinkled surfaces, includes, but is not limited to, any tuberous vegetable, beets, turnips, radish, leeks, or any root vegetable. In one embodiment, a tuber is a potato, sweet potato, carrot, cassava, swede, or yam. A fruit that may be cut into 2, 3, 4, 5, 6, 7, 8, 9, 10, or more than 10 spiral pieces that may have smooth or textured/crinkled surfaces, includes, but is not limited to, apples, squash, bell peppers, pumpkin, zucchini, cucumber, mangos, and plantains. A vegetable or fruit when it is processed and cut according to the methods disclosed herein does not necessarily have to be whole. That is, chunks or cut pieces of a vegetable may be pumped into the cutting system and those chunks or pieces subsequently cut with cutting blades to produce spiral pieces or spiral fragments.

The present invention in particular encompasses a new french fry that is spiral-cut and which may have smooth or crinkled surfaces. See, for instance, the spiral potato pieces shown in FIG. 9. The types of spiral-cut potato wedges are a new line of edible products, and can be made in different sizes or textured or smooth surfaces according to the present invention. Thus one embodiment of the present invention is a package containing multiple spiral-cut potato pieces or wedges wherein substantially all the spiral cut pieces or wedges are about the same or similar size to each other. In another embodiment of the present invention is a package containing multiple spiral-cut potato pieces or wedges wherein many of the spiral cut pieces or wedges are about the same or similar size to each other. A "package" may be a bag of the sort used to hold chips, or an open holder such as to hold fast-food french fries, or any such containment structure or vessel. In any of these embodiments, one or more or all of the spiral cut potato pieces or wedges in a package may have a crinkle-cut surface. In another embodiment, the spiral cut potato pieces or wedges in the package may be raw or may be cooked, such as fried, roasted, or oven-baked. Accordingly, one embodiment of the present invention is a collection of spiral-cut potato pieces that are raw, a collection of spiral-cut potato pieces that are fried, or a collection of spiral-cut potato pieces that are oven-baked, or a collection of spiral-cut potato pieces that are roasted, wherein the pieces have smooth surfaces or have a crinkle-cut surface. By "smooth" surface is meant a spiral cut product that has been cut with a cutting blade that has a flat, untextured, surface and edge. By "crinkle-cut" is meant a spiral cut product that has been cut with a cutting blade that has a crinkled or wavy surface and edge, such as those shown in FIG. 10. In a further embodiment, the spiral-cut potato wedges may be further processed or seasoned, such as to produce battered or beer battered spiral-cut fried or oven-baked potato wedges.

Pieces of wood may also be cut into 2, 3, 4, 5, 6, 7, 8, 9, 10, or more than 10 spiral pieces that may have smooth or textured/crinkled surfaces. Softwoods could be cut according to the present invention, for instance. Examples of softwood include but are not limited to pine, redwood, fir, cedar, and larch. Other materials may be cut according to the present invention too, such as polystyrene, foam, solid paper pulp materials, and plastics.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

This invention relates generally to devices and methods for cutting food products, such as vegetable products, and particularly such as raw potatoes and the like, into spiral or helical shaped pieces, whose cut surfaces may be patterned by the design of knife blades, such as to create "crinkle-cut" spiral or helical pieces.

More particularly, this invention relates to a rotatably driven knife fixture having a selected number of knife blades adapted to cut a raw potato or the like into generally spiral shaped pieces.

Figure 1:
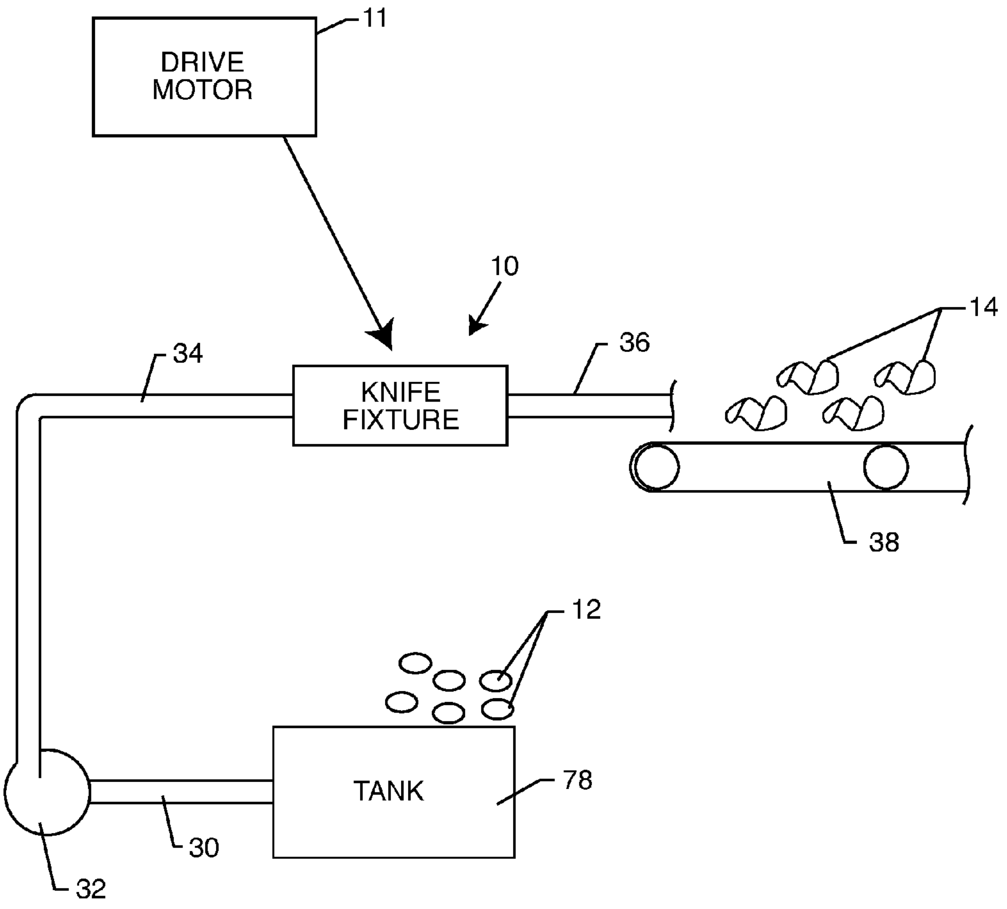
FIG. 1 is a schematic diagram depicting a hydraulic cutting system of a type utilizing a rotatably driven knife fixture constructed in accordance with the present invention.

As shown in the exemplary drawings, a hydraulic cutting system comprises a conventional so-called water knife fixture referred to generally in FIG. 1 by the reference numeral 10 for cutting vegetable products such as whole potatoes 12 into spiral shaped pieces 14 for subsequent processing. The present invention comprises a rotary driven knife fixture 10 (FIGS. 2-7) for installation into the cutting system and for rotatable driving by means of a drive motor 11 or the like. The knife fixture 10 includes at least one rotatably driven cutting blade 16 (FIGS. 2-4) for cutting the product into a pair of generally spiral shaped pieces 14 of the same or similar size and shape. In alternative embodiments, the single cutting blade 16 can be combined with a second cutting blade 17 (FIG. 5) to cut the product into four spiral shaped pieces, with a third cutting blade 18 (FIG. 6) to cut the product into six spiral shaped pieces, or with a fourth cutting blade 19 (FIG. 7) to cut the product into eight spiral shaped pieces. Indeed, any number of cutting blades can be used for subdividing the product into twice the number of spiral shaped pieces of substantially similar size and shape.

FIG. 1 shows the cutting system in the form of a hydraulic cutting system comprising a tank 78 or the like for receiving a supply of vegetable products, such as the illustrative raw whole potatoes 12 in a peeled or unpeeled state. Alternatively, these potatoes 12 can comprise halves or pieces of whole potatoes, peeled or unpeeled. In one preferred form, these potatoes 12 comprise relatively small potatoes or potato pieces having a longitudinal length on the order of about 3 inches. It is noted, however, that actual potato size is unimportant, as long as the potato has a diametric size to fit through the knife fixture.

As viewed in FIG. 1, the potatoes 12 are delivered via an inlet conduit 30 to a pump 32 which propels the potatoes in single file relation within a propelling water stream or flume through a tubular delivery conduit 34 into cutting engagement with the blades (not shown in FIG. 1) of the water knife fixture 10. In a typical hydraulic cutting system, the potatoes are propelled through the delivery conduit 34 at a relatively high velocity of about 25 feet per second (fps), or about 1,500 feet per minute (fpm), to provide sufficient kinetic energy whereby each potato is propelled through the knife fixture 10 to produce (as will be described in more detail herein, per the blade pitch angle) the desired elongated spiral cut pieces 14. In this regard, the delivery conduit 34 may include a centering alignment device (not shown) for substantially centering each potato 12 on a longitudinal centerline of the flow passage extending through the associated knife fixture 10, in a manner known to persons skilled in the art. The cut strips 14 travel through a short discharge conduit 36 to a conveyor 38 or the like which transports the cut strips 14 for further processing, such as blanching, drying, batter coating, parfrying, freezing, etc.

Persons skilled in the art will recognize and appreciate that alternative form cutting systems may be used, to include, by way of example, mechanical cutting systems wherein the vegetable products such as potatoes are mechanically delivered via a chute or hopper or the like to the knife fixture 10. In either case, the knife fixture 10 is mounted along a production path and is rotatably driven for engaging and cutting the incoming products into the desired spiral shaped pieces.

Figure 2:
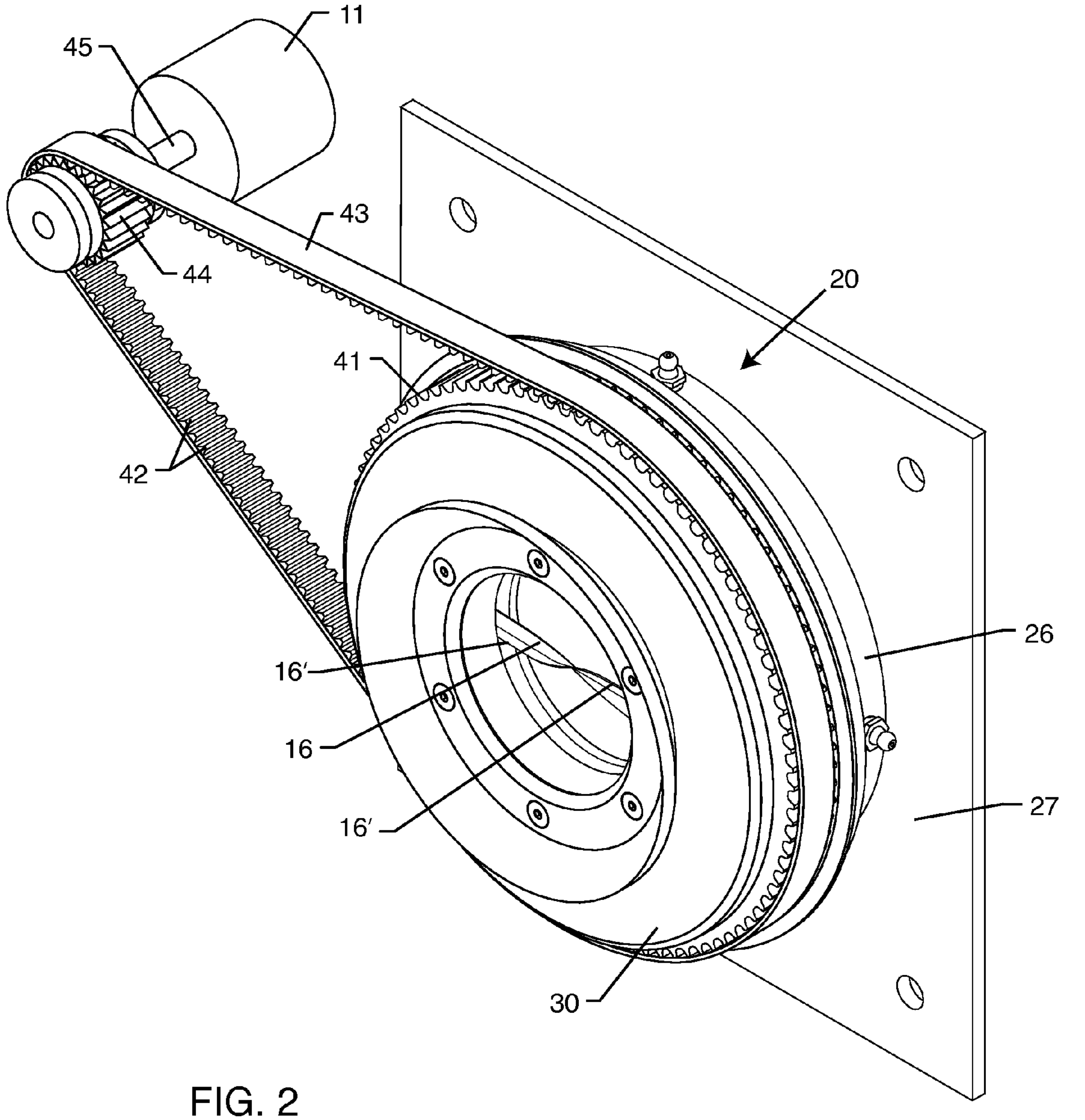
FIG. 2 is an enlarged perspective view illustrating a drive motor and cog belt for rotatably driving the knife fixture of FIG. 1.
Figure 3:
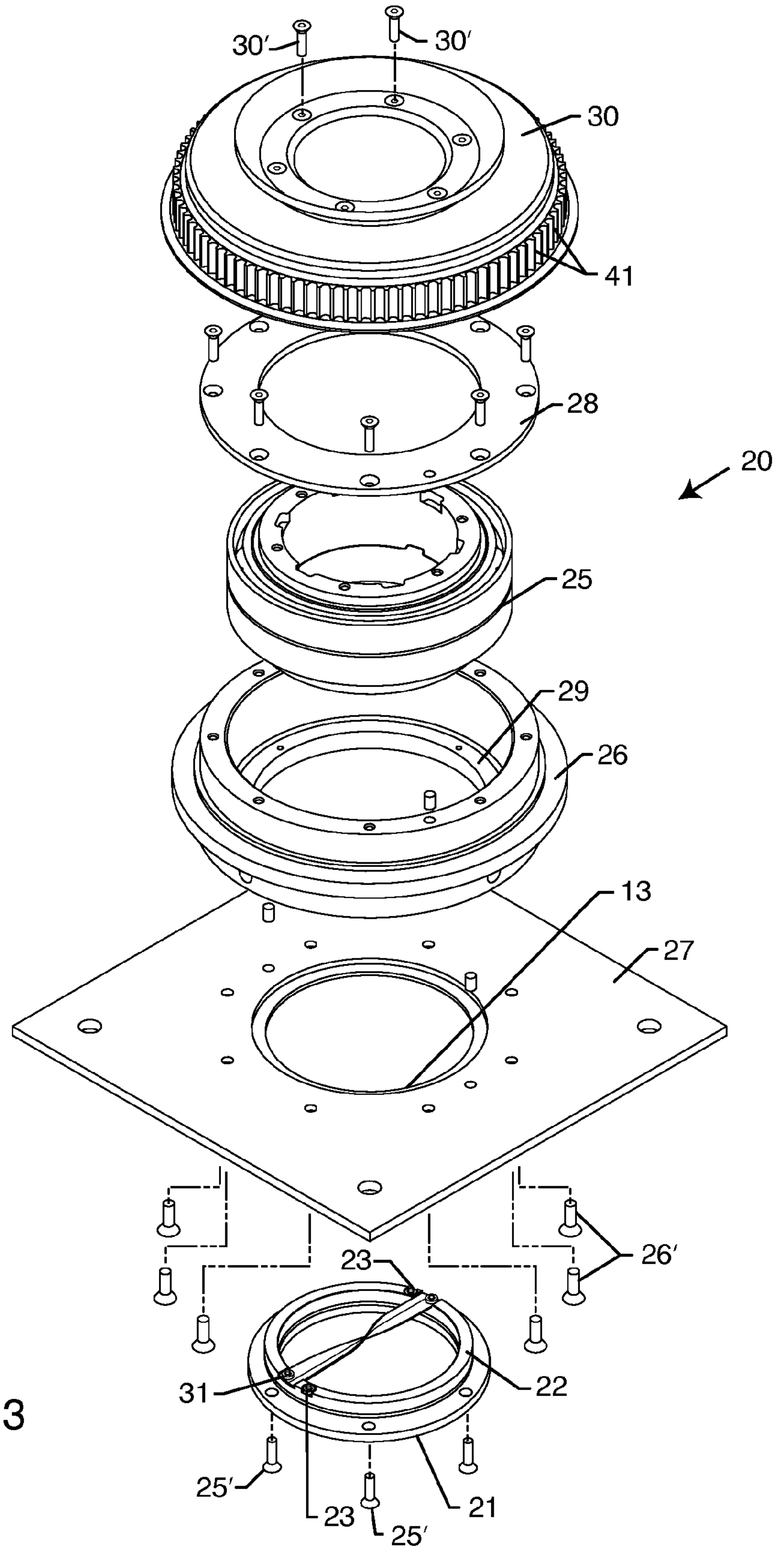
FIG. 3 is an exploded perspective view showing rotatable mounting of the knife fixture within a rotary bearing unit.

FIGS. 2-3 show installation of the illustrative knife fixture 10 into a rotary bearing unit 20 in a position in-line with a production path for the vegetable products such as the potatoes 12 (FIG. 1). In this regard, the illustrative knife fixture 10 comprises a generally ring-shaped blade holder 22 of generally annular or circular shape, and having a cross sectional area sufficient for providing a relatively stiff or sturdy structure capable of withstanding the rigors of a production environment over an extended period of time. This blade holder 22 is secured as by means of clamp screws 23 or the like onto downstream or lower annular ring 21 or the like adapted in turn for affixation to the lower or downstream end of a rotatable bearing assembly 25 as by means of screws 25' or the like.

As shown in FIG. 3, the bearing assembly 25 is rotatably carried within a bushing 26 mounted as by means of screws 26' or the like onto an upstream or upper side of the enlarged plate 27, which has an opening 13 formed therein for in-line installation along the production flow path. A flange plate 28 overlies the bearing assembly 25 for sandwiching the assembly 25 against an internal shoulder 29 within the bushing 26. A driven ring 30 is mounted in turn as by means of screws 30' onto the bearing assembly 25 for rotation therewith.

The driven ring 30 of the rotary bearing unit 20 includes a circumferential array of detents 41 for registry with teeth 42 of a cog-type drive belt 43 (FIG. 2). This drive belt 43 is in turn reeved about a drive gear 44 on an output shaft 45 of the drive motor 11 (FIG. 2). Accordingly, the drive motor 11 positively drives the driven ring 30 and associated bearing assembly 25 secured thereto at a known speed, preferably on the order of about 6,000 rpm in the case of the illustrative hydraulic cutting system, for correspondingly rotatably driving the knife fixture 10 at the same rotational speed. Importantly, the cog-type drive belt 43 beneficially insures constant-speed rotatable driving of the knife fixture 10 notwithstanding periodic impact engagement of the water-propelled potatoes therewith.

Figure 4:
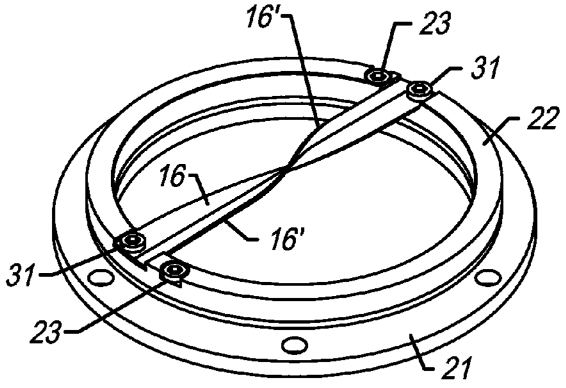
FIG. 4 is a front side perspective view of one cutting blade carried by a ring-shaped blade holder in accordance with one preferred form of the invention.

In one preferred configuration as viewed in FIGS. 2-4, a single cutting blade 16 is used to cut each incoming vegetable product such as a potato 12 into two separate, generally spiral shaped pieces 14 (FIG. 1) of similar size and shape. The cutting blade 16 is shown with a sharpened cutting edge 16' along one side thereof. Since the cutting blade 16 is twisted generally at a radial center, or a longitudinal centerline or axis of the hydraulic flow path, two cutting edges 16' are defined to extend radially outwardly in opposite directions, and in opposite-facing circumferential directions. A pair of clamp screws 31 or the like are secured through the respective opposite ends of the cutting blade 16 to seat the cutting blade within a shallow recess formed at an appropriate pitch angle.

More specifically, the specific pitch angle of the cutting blade 16 at each specific point along its radial length is given by the formula:

$$\text{Pitch Angle}=\text{Arc Tan}(2\times\text{Pi}\times\text{Radius}/\text{Pitch Length}). \quad (1)$$

For a total blade radius of 2 inches, and a pitch length of about 3 inches, the clamp screws 31 secure the outermost radial ends of each cutting blade 16 or 17 at a pitch angle of about 76.6° to the axial blade centerline. It will be understood, however, that the specific pitch angle is directly proportional to the radial point along the blade, whereby the pitch angle increases from the radial center. It is this pitch angle that determines the spiral shape of the cut product.

If more spiral shaped pieces 14 are desired from each potato 12, more cutting blades are used recognizing that each of the cutting blades cuts the incoming product in two, and thereby produces twice the number of spiral shaped pieces in comparison with the number of cutting blades used. Importantly, the cutting blades are arranged in succession at controlled angles to obtain similar or virtually identical cut spiral shaped pieces.

Figure 5:
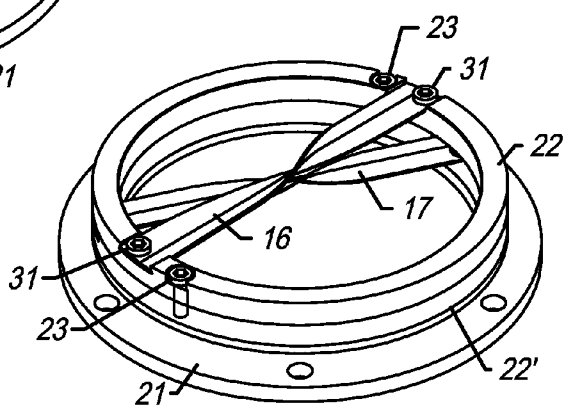
FIG. 5 is a front side perspective view of a pair of cutting blades carried respectively by a corresponding pair of blade holders in accordance with one alternative preferred form of the invention.

More particularly, in one preferred form as viewed in FIG. 5, two cutting blades 16 and 17 are supported by separate blade holders 22 and 22' in a stack on the associated annular ring 21, as by means of elongated screws 23. That is, aligned screw ports are formed in the second blade holder 22' at the appropriate positions for receiving the elongated screws 23 used to fasten the drive rings 22, 22' and the underlying annular ring 21 together for concurrent rotation.

Figure 11:
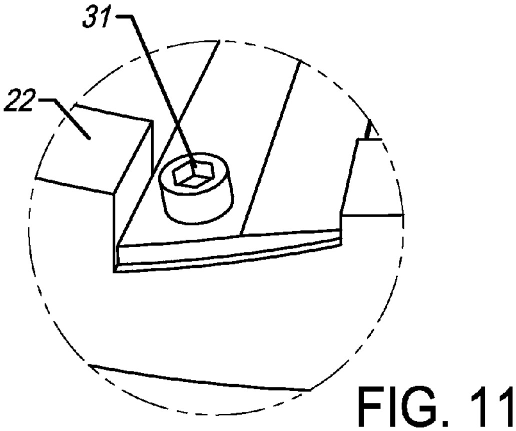
FIG. 11 is an enlarged front side perspective view taken about the circle 11 in FIG. 7, further illustrating the inclined mounting surface in the blade holder.

The two cutting blades 16 and 17 are generally identical to each to each other, to include a twisted shape generally at a longitudinal center axis thereof and extending radially outwardly in opposite directions for seated engagement as by means of clamp screws 31 or the like at the selected pitch angle. Using formula (1) above for the specific pitch angle of each blade 16 or 17 along its radial length, and wherein the total blade radius is 2 inches and the pitch length is 3 inches, the clamp screws 31 secure the outermost radial ends of each cutting blade 16 or 17 at a pitch angle of about 76.6°. In this respect, FIG. 11 more specifically illustrates the inclined mounting surface in the blade holder 22 at the point where the clamp screws 31 secure the cutting blade 16 to the blade holder 22.

In addition, when the two cutting blades 16 and 17 are rotated at about 6,000 revolutions per minute (rpm), to advance each product to be cut along the hydraulic flow path at a velocity of about 25 feet per second (fps), the two cutting blades 16 and 17 both cut the incoming product into two pieces, for a total of four spiral shaped pieces 14 of similar or identical shape. With a pitch length of about 3 inches potato travel for each cutting blade revolution, and with each of the blade holders 22, 22' having an axial dimension of about 0.5 inch, the angle Θ (theta) separating each of the supported cutting blades is given by the formula:

$$\Theta=(((T/P\times 360°)+(360°/N)), \text{ where } T=\text{axial dimension of each blade holder}, P=\text{pitch length, and } N=\text{number of cut piece.} \quad (2)$$

In the case of the two cutting blades 16, 17 adapted to cut each incoming product into four generally identical spiral shaped pieces, the angle Θ=150°.

Figure 6:
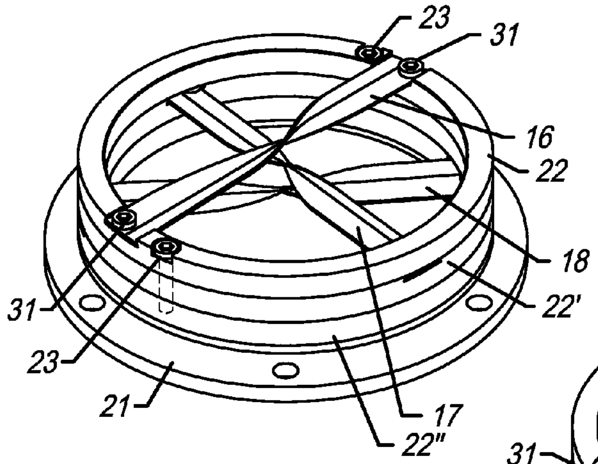
FIG. 6 is a front side perspective view of a knife fixture including three cutting blades respectively supported by three blade holders in accordance with a further alternative preferred form of the invention.
Figure 7:
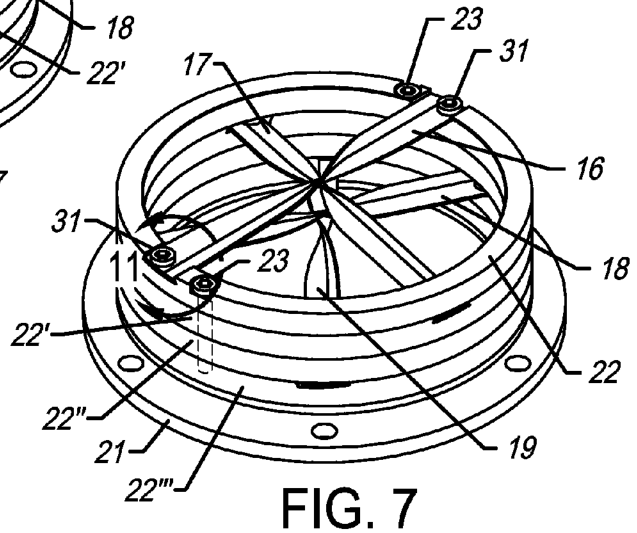
FIG. 7 is a front side perspective view of four cutting blades carried respectively by four blade holders in accordance with another alternative preferred form of the invention.

FIGS. 6 and 7 illustrate two exemplary alternative preferred forms of the invention, wherein three cutting blades 16, 17 and 18 are separately supported by a stack of three ring-shaped blade holders 22, 22', and 22" for cutting each incoming product into a total of six spiral shaped pieces (FIG. 6), and also wherein four cutting blades 16, 17, 18 and 19 are separately supported by a stack of four ring-shaped blade holders 22, 22', 22", and 22'" (FIG. 7) for cutting each incoming product into a total of eight spiral shaped pieces. In the examples of FIGS. 6 and 7, formula (2) is followed to determine the angular setting of each cutting blade in succession in order to form the multiple spiral shaped pieces of identical or similar shapes. In FIG. 6, the cutting blades are set at successive angles of about 120° to cut products per U.S. Pat. D640,036 which is incorporated by reference herein, whereas in FIG. 7, the cutting blades are set at successive angles of about 105°. In each case, clamp screws 31 are used to seat each of cutting blades at the selected pitch angle within the recess formed in the associated blade holder. Similarly, screws 23 or the like are fitted and secured through aligned ports formed in the stacked blade holders for securing them together for rotation with the bearing assembly 25.

Persons skilled in the art will understand and appreciate, of course, that virtually any number of cutting blades can be used, with the formula (2) determining the angular spacings of the multiple cutting blades in succession. For example, when five cutting blades are used, a total of ten spiral shaped pieces are formed; following formula (2), the successive cutting blade angular spacings would be about 96°. Similarly, when six cutting blades are used, a total of twelve spiral shaped pieces are formed; following formula (2), the successive cutting blade angular spacings would be about 90°. Persons skilled in the art will also appreciate that when three or more cutting blades are used, the formula (2) determines that angular spacings of the blades as a group, but that each of the blades need only be set at one of the angular positions; that is, the blades do not need to be set at a regular lag interval, so long as one of the blades in the group is set at each one of the angular positions.

Alternately, it will be understood that other forms of the blade holders and the related interconnection means can be employed, such as the formation of steps including interengaging tabs and slots in the respective blade holders to insure the desired angular position of the cutting blades and concurrent rotation thereof.

Figure 9:
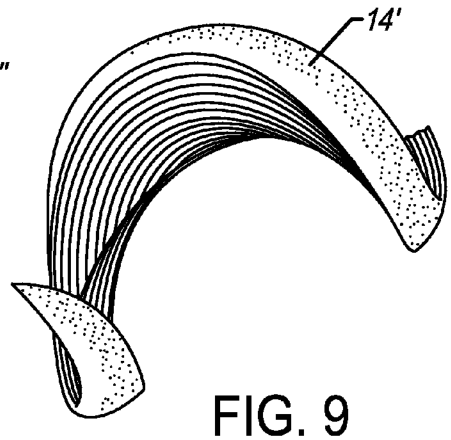
FIG. 9 is a drawing showing a spiral piece or wedge cut with the crinkle cut knife blades shown in FIG. 8.

In an alternative preferred form, the present invention encompasses a new french fry that is spiral-cut and which may have corrugated or crinkled surfaces. See, for instance, the spiral potato pieces 14' shown in FIG. 9. The types of spiral-cut potato wedges are a new line of edible products, and can be made in different sizes or textured surfaces according to the present invention. Thus one embodiment of the present invention is a package containing multiple spiral-cut potato pieces or wedges 14' wherein substantially all the spiral cut pieces or wedges are about the same or similar size to each other. In another embodiment of the present invention is a package containing multiple spiral-cut potato pieces or wedges 14' wherein many of the spiral cut pieces or wedges are about the same or similar size to each other. A "package" may be a bag of the sort used to hold chips, or an open holder such as to hold fast-food french fries, or any such containment structure or vessel. In any of these embodiments, one or more or all of the spiral cut potato pieces or wedges in a package may have a crinkle-cut surface. In another embodiment, the spiral cut potato pieces or wedges in the package may be raw or may be cooked, such as fried, roasted, or oven-baked.

Accordingly, one embodiment of the present invention is a collection of spiral-cut potato pieces that are raw, a collection of spiral-cut potato pieces that are fried, or a collection of spiral-cut potato pieces that are oven-baked, or a collection of spiral-cut potato pieces that are roasted, wherein the pieces have smooth surfaces or have a crinkle-cut surface. By "smooth" surface is meant a spiral cut product that has been cut with a cutting blade 16, 17, 18 or 19 that has a flat, untextured, surface and edge, as viewed in FIGS. 4-7. By "crinkle-cut" is meant a spiral cut product that has been cut using a modified knife fixture 11' with a cutting blade 16", 17", 18", or 19" that has a crinkled or wavy surface and edge 16'", 17'", 18'", or 19'", such as those shown in FIG. 8. In a further embodiment, the spiral-cut potato wedges may be further processed or seasoned, such as to produce battered or beer battered spiral-cut fried or oven-baked potato wedges.

Figure 8:
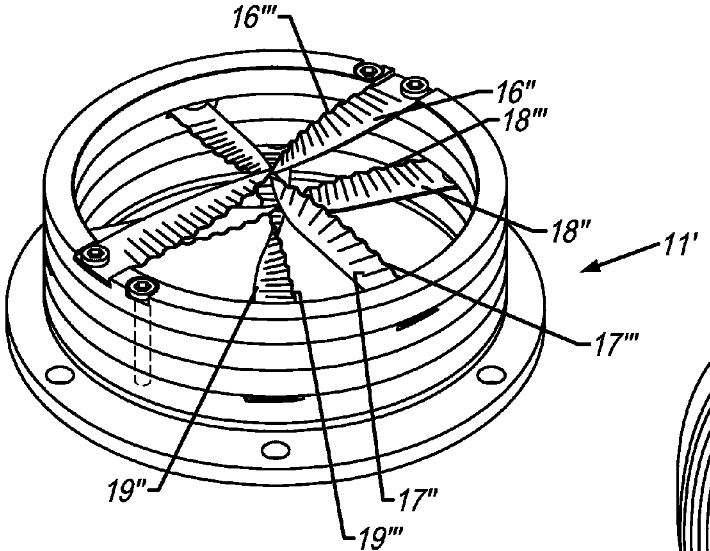
FIG. 8 is a drawing similar to FIG. 7 but showing four corrugated or crinkle cut knife blades.
Figure 10:
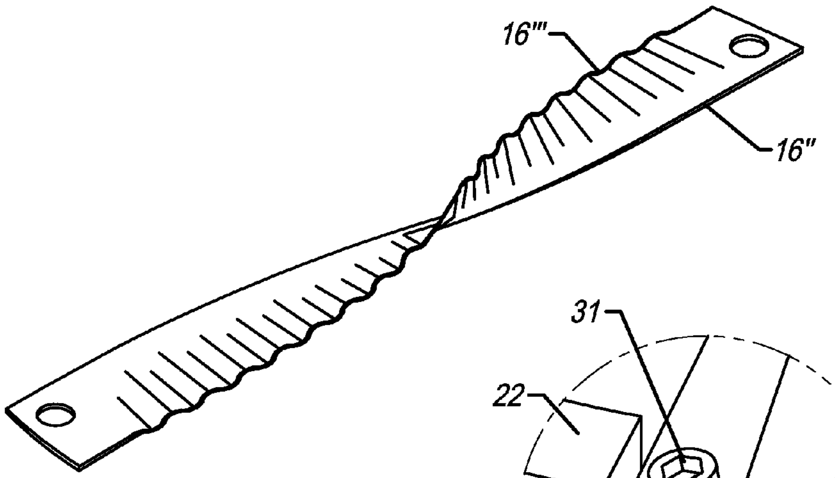
FIG. 10 is a drawing of an exemplary cutting blade designed to have textured or wavy or crinkled surfaces and edges so as to produce spiral pieces or wedges that have similarly textured, wavy, or crinkled cut surfaces.

It will be understood, of course, that the modified knife fixture 11' shown in FIG. 8 can be equipped with one or more of the cutting knives of a corrugated and crinkle-cut configuration, as per any one of the knife blade embodiments depicted in FIGS. 4-7. Indeed, more than four such knife blades can be used, if more than 8 spiral-cut wedges are desired. It will also be recognized and understood that different size corrugations or crinkle-cut configurations can be used for the various knife blades, such as illustrated in FIG. 10 with respect to the corrugated knife blade 16", and the associated cutting edge 16'".

A variety of modifications and improvements in and to the rotary knife fixture 10 of the present invention will be apparent to those persons skilled in the art. As one example, persons skilled in the art will understand that each of the twisted cutting blades as shown and described herein can be replaced by a pair of individual blades aligned diametrically with each other and having a pitch angle as defined by formula (1), but otherwise unconnected at the axial centerline of the flow path. As a further alternative, the blades do not need to be aligned diametrically, but an odd number of unconnected blades can be used in the event that an odd number of product cuts is desired. Accordingly, no limitation on the invention is intended by way of the foregoing description and accompanying drawings, except as set forth in the appended claims.

What is claimed is:

1. A rotary knife fixture for cutting products propelled into cutting engagement therewith at a selected speed, comprising:
- a blade holder having a generally ring-shaped configuration;
- a bearing assembly carrying said blade holder;
- means for rotatably driving said bearing assembly to correspondingly rotatably drive said blade holder at a selected rotational speed;
- at least one cutting blade carried by said blade holder, said at least one cutting blade having a sharpened cutting edge at one side thereof and being twisted generally at a centerline thereof to define a pair of cutting edges presented generally in opposite-facing circumferential directions; and
- means for securing opposite ends of said at least one cutting blade to a pair of respective inclined mounting surfaces in said blade holder at a pitch angle defined by the formula:

Pitch Angle=Arc Tan(2×Pi×Radius/Pitch Length).

2. The rotary knife fixture of claim 1 further including hydraulic means for propelling the products into cutting engagement therewith along a hydraulic flow path.

3. The rotary knife fixture of claim 1 wherein said means for securing opposite ends of said at least one cutting blade to said blade holder comprises a pair of clamp screws disposed generally at opposite ends of said at least one cutting blade for seating the opposite ends of said at least one cutting blade within respective shallow recesses formed within said blade holder at said selected pitch angle.

4. The rotary knife fixture of claim 1 wherein said means for rotatably driving said bearing assembly comprises a driven ring on said bearing assembly, a drive ring carried on an output shaft of a drive motor, and a cog belt coupled between said driven and drive rings.

5. The rotary knife fixture of claim 1 wherein said means for rotatably driving said bearing assembly is adapted to rotatably drive said bearing assembly at a rotational speed of about 6,000 rpm.

6. The rotary knife fixture of claim 2 wherein said at least one cutting blade comprises a plurality of cutting blades mounted in succession along a longitudinal centerline of the hydraulic flow path, said plurality of cutting blades being angularly set in succession at controlled angles (Θ) defined by the formula: $\Theta=(((T/P\times 360°)+(360°/N))$, where T=axial dimension of each blade holder, P=pitch length, and N=number of cut pieces, to cut a plurality of generally identically shaped pieces from each of the products propelled along the hydraulic flow path.

7. The rotary knife fixture of claim 1 wherein said at least one cutting blade is selected from the group comprising a straight-cut and crinkle-cut cutting edge.

8. The rotary knife fixture of claim 6 wherein said plurality of cutting blades is selected from the group comprising straight-cut and crinkle-cut cutting edges.

9. The rotary knife fixture of claim 6 wherein said plurality of cutting blades comprises a combination of straight-cut and crinkle-cut cutting edges.

10. The rotary knife fixture of claim 1 wherein the products propelled along the hydraulic flow path comprise products selected from the group consisting of vegetables, fruits and wood products.

11. The rotary knife fixture of claim 1 wherein the products propelled along the hydraulic flow path comprise potatoes.

12. A rotary knife fixture for cutting potatoes propelled at a selected speed into cutting engagement therewith, comprising:
- a blade holder having a generally ring-shaped configuration;
- a bearing assembly carrying said blade holder;
- means for rotatably driving said bearing assembly to correspondingly rotatably drive said blade holder at a selected rotational speed;
- at least one cutting blade carried by said blade holder, said at least one cutting blade having a sharpened cutting edge at one side thereof and being twisted generally at a longitudinal centerline thereof to define a pair of cutting edges presented generally in opposite-facing circumferential directions; and
- means for securing opposite ends of said at least one cutting blade to a pair of respective inclined mounting surfaces in said blade holder at a pitch angle defined by the formula:

Pitch Angle=Arc Tan(2×Pi×Radius/Pitch Length).

13. The rotary knife fixture of claim 12 further including hydraulic means for propelling the potatoes into cutting engagement therewith along a hydraulic flow path.

14. The rotary knife fixture of claim 12 wherein said means for securing opposite ends of said at least one cutting blade to said blade holder comprises a pair of clamp screws disposed generally at opposite ends of said at least one cutting blade for seating the opposite ends of said at least one cutting blade within respective shallow recesses formed within said blade holder at said selected pitch angle.

15. The rotary knife fixture of claim 12 wherein said means for rotatably driving said bearing assembly comprises a driven ring on said bearing assembly, a drive ring carried on an output shaft of a drive motor, and a cog belt coupled between said driven and drive rings.

16. The rotary knife fixture of claim 12 wherein said means for rotatably driving said bearing assembly is adapted to rotatably drive said bearing assembly at a rotational speed of about 6,000 rpm.

17. The rotary knife fixture of claim 13 wherein said at least one cutting blade comprises a plurality of cutting blades mounted in succession along a longitudinal centerline of the hydraulic flow path, said plurality of cutting blades being angularly set in succession at controlled angles (Θ) defined by the formula: $\Theta=(((T/P\times 360°)+(360°/N))$, where T=axial dimension of each blade holder, P=pitch length, and N=number of cut pieces, to cut a plurality of generally identically shaped pieces from each of the potatoes propelled along the hydraulic flow path.

18. The rotary knife fixture of claim 12 wherein said at least one cutting blade is selected from the group comprising a straight-cut and crinkle-cut cutting edge.

19. The rotary knife fixture of claim 17 wherein said plurality of cutting blades is selected from the group comprising straight-cut and crinkle-cut cutting edges.

20. The rotary knife fixture of claim 17 wherein said plurality of cutting blades comprises a combination of straight-cut and crinkle-cut cutting edges.

* * * * *